US00RE45301E

(19) United States
(12) Reissued Patent
Haumont et al.

(10) Patent Number: US RE45,301 E
(45) Date of Reissued Patent: Dec. 23, 2014

(54) LOCATION MANAGEMENT IN A MOBILE TELECOMMUNICATION SYSTEM

(75) Inventors: Serge Haumont, Helsinki (FI); Heikki Lindholm, Helsinki (FI); Lauri Söderbacka, Fleet (GB); Juha Bäck, Helsinki (FI); Juhapekka Niemi, Tampere (FI); Matti Keskinen, Järvenpää (FI); Jari Hartikainen, Salo (FI)

(73) Assignee: Nokia Corporation, Espoo (FI)

(21) Appl. No.: 10/827,698

(22) Filed: Apr. 20, 2004

Related U.S. Patent Documents

Reissue of:
(64) Patent No.: 6,584,314
Issued: Jun. 24, 2003
Appl. No.: 09/591,679
Filed: Jun. 9, 2000

U.S. Applications:
(63) Continuation of application No. PCT/FI98/00971, filed on Dec. 11, 1998.

(30) Foreign Application Priority Data

Dec. 12, 1997 (FI) ..... 974502

(51) Int. Cl.
*H04W 4/00* (2009.01)
*H04W 36/00* (2009.01)
*H04W 24/00* (2009.01)

(52) U.S. Cl.
USPC ..... 455/435.1; 455/422.1; 455/433; 455/440; 455/456.1; 455/456.2; 370/337; 370/338

(58) Field of Classification Search
CPC ..... H04W 60/00; H04W 60/04; H04W 8/04; H04W 8/06; H04W 68/00; H04W 68/06
USPC ..... 455/433, 440, 456.2, 432.1, 435.1, 436, 455/437, 442, 443, 445; 370/337, 338, 328, 370/331
See application file for complete search history.

(56) References Cited

U.S. PATENT DOCUMENTS 5,305,466 A 4/1994 Taketsugu
5,548,816 A 8/1996 DeVaney (Continued)

FOREIGN PATENT DOCUMENTS

EP 0 808 036 11/1997
JP 9-51570 2/1997 ..... H04Q 7/22

(Continued)

OTHER PUBLICATIONS

Laatu (WO94/13114), "Location Updating in a Cellular Radio System", Jun. 9, 1994, Fig.1 and pp. 1-12.*

(Continued)

*Primary Examiner* — Wesley Kim
(74) *Attorney, Agent, or Firm* — Squire Patton Boggs (US) LLP

(57) ABSTRACT

The basic idea of the invention is to separate the location area used in the RAN and the reporting area used when reporting the location of the mobile to the core network. The size of the location area is selected preferably in the RAN based on the services used by the subscriber to optimize the use of radio resources. A reporting area comprises one or a plurality of location areas. The size of a reporting area is selected based on the accuracy of location information needed in the core network. The RAN informs the core network when a subscriber moves out of his current location area. The core network and the radio access network negotiate the size of the reporting area prior to the activation of the service. Additionally, the reporting areas can be renegotiated when the service is in the active state.

8 Claims, 5 Drawing Sheets

(56) References Cited

U.S. PATENT DOCUMENTS

| | | | | | |
|---|---|---|---|---|---|
| 5,568,153 | A * | 10/1996 | Beliveau | 342/357.43 |
| 5,722,077 | A * | 2/1998 | Kanai | 455/452.1 |
| 5,835,061 | A * | 11/1998 | Stewart | 342/457 |
| 5,875,400 | A * | 2/1999 | Madhavapeddy et al. | 455/458 |
| 5,884,175 | A * | 3/1999 | Schiefer et al. | 455/436 |
| 5,889,770 | A * | 3/1999 | Jokiaho et al. | 370/337 |
| 5,907,802 | A * | 5/1999 | Scott | 455/406 |
| 5,960,345 | A * | 9/1999 | Laatu | 455/435.1 |
| 6,038,445 | A * | 3/2000 | Alperovich et al. | 455/432.1 |
| 6,078,575 | A * | 6/2000 | Dommety et al. | 370/338 |
| 6,157,833 | A * | 12/2000 | Lawson-Jenkins et al. | 455/436 |
| 6,181,940 | B1 * | 1/2001 | Rune | 455/435.2 |
| 6,185,421 | B1 * | 2/2001 | Alperovich et al. | 455/433 |
| 6,212,390 | B1 * | 4/2001 | Rune | 455/456 |
| 6,275,706 | B1 * | 8/2001 | Rune | 455/456.1 |
| 6,397,065 | B1 * | 5/2002 | Huusko et al. | 455/426 |
| 6,584,314 | B1 * | 6/2003 | Haumont et al. | 455/435.1 |

FOREIGN PATENT DOCUMENTS

| | | |
|---|---|---|
| WO | 95/11577 | 4/1995 |
| WO | 95/28063 | 10/1995 |
| WO | 96/07277 | 3/1996 |
| WO | 96/39000 | 12/1996 |
| WO | 97/13387 | 4/1997 |
| WO | 98/37721 | 8/1998 |
| WO | 98/37722 | 8/1998 |

OTHER PUBLICATIONS

Jun. 10, 1999 International Search Report for PCT/FI98/00971.

* cited by examiner

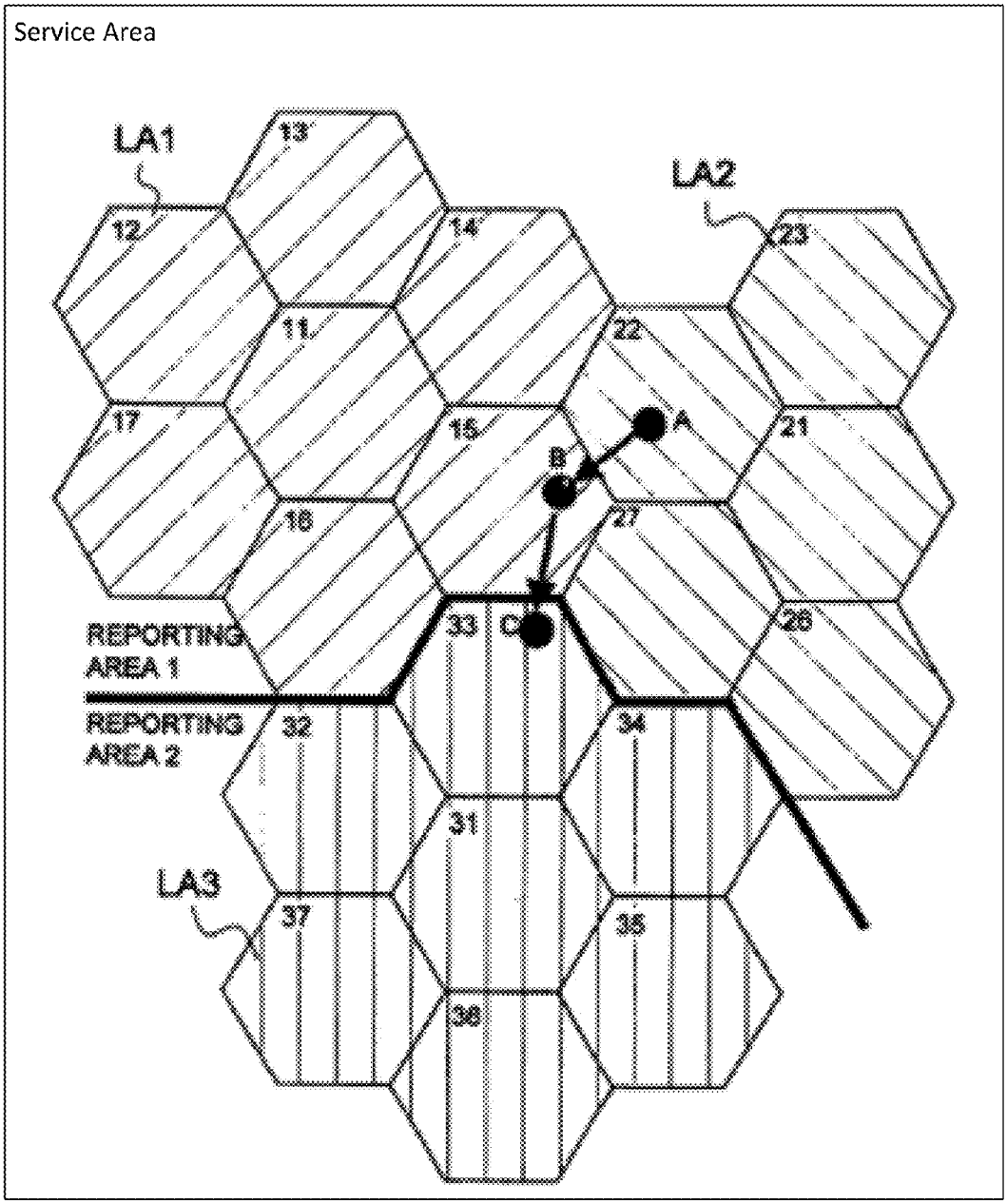
Fig. 5
NEW

LOCATION MANAGEMENT IN A MOBILE TELECOMMUNICATION SYSTEM

Matter enclosed in heavy brackets [ ] appears in the original patent but forms no part of this reissue specification; matter printed in italics indicates the additions made by reissue.

This is a continuation of Application No. PCT/F198/00971 filed Dec. 11, 1998.

FIELD OF THE INVENTION

This invention concerns location management in a mobile telecommunication system.

BACKGROUND OF THE INVENTION

FIG. 1 shows a system in which one Radio Access Network RAN is connected to a plurality of Core Networks CN. Such a RAN is planned to be implemented in the Universal Mobile Telephony System UMTS currently being standardized by ETSI (European Telecommunication Standards Institute), for example. The RAN provides the radio connection for the subscribers of a plurality of core networks and is therefore also called Generic RAN, i.e. GRAN. The services are provided by the core networks connected to the RAN using the $I_u$ interface. In the figure, the GSM, UMTS, GPRS (General Packet Radio Service), and ISDN (Integrated Services Digital Network) core networks are shown. The Mobile Station MS can make connections to the core networks using radio connections to the RAN. The MS makes radio connections to the base stations of the radio access network. The RAN routes the connections to the core network whose service the subscriber is currently using.

Information concerning the location of the mobile station is needed in the radio access network for routing incoming calls and other services provided by the core networks. For location management, the geographical area served by a radio access network is divided into one or a plurality of Location Areas LA. The location of a mobile station is tracked with an accuracy of one location area. Within the location area, the mobile station can move without informing the RAN about its movements. The location area consists of one or a plurality of cells, a cell being the coverage area of a base station. The base stations send information about themselves continuously. This information comprises the identity and the location area of the base station. Based on this information, the mobile station knows the location area it is visiting at all times. Additionally, the mobile knows the identity of the location area of its latest location update, i.e. its currently specified location area. When recognizing that the location area identification sent by the base station having the best signal is different from the location area of the mobile, the mobile initiates a location update procedure. In the procedure, the mobile contacts the RAN to inform it of the new location area.

The size of the location areas is always selected as a compromise. When using very small location areas, the moving mobile stations have to contact the network rather frequently to inform the network about their new location areas. The frequent location updates reserve a lot of radio transmission capacity, which can then not be used for transmission of user information. On the other hand, when using very large location areas, the mobile that is receiving a call has to be paged from a large area comprising lots of base stations thus reserving unnecessary amounts of transmission capacity. Therefore, the optimum size for a location area is a compromise depending on both the mobility of the subscribers and the amount of calls coming to the subscribers.

The location can be defined using different levels of accuracy. When using a packet switched service such as GPRS in the standby state, the location is tracked with an accuracy of a smaller location area, i.e. a routing area. This size of a routing area is smaller than the size of a location area, typically one or a few cells. When there are packets to be transferred, the service moves to the active state. For this, the mobile using the service is paged from the routing area. In the active state the location of the mobile is tracked with an accuracy of one cell. When there are no packets to be sent, the service returns to the standby state after a short delay. When the packet stream continues, the mobile is paged again from the routing area. The mobile has to be paged a plurality of times during one connection. Therefore, the number of pages made during a packet switched connection is generally much larger than the number of paging messages sent by the RAN when the mobile is in the idle state of a circuit switched connection. This is the reason for using smaller locations areas, i.e. routing areas, in packet switched services.

The location information is needed in the RAN in order to provide the radio connections for the services provided by the core networks. Hence, in a system shown in FIG. 1, it is preferable to store the location information in the RAN. The services offered by a core network may also depend on the location of the subscriber, i.e. the subscriber is offered different services in different service areas. Therefore, the location updates of the mobile subscriber have to be passed to the core network as well. This requires signaling and causes an unnecessary load on the $I_u$ interface.

The problem with the prior art is the handling of location information between the RAN and the core networks. The objective of the present invention is to solve this problem. This objective is achieved using the method defined in the independent claim.

SUMMARY OF THE INVENTION

The basic idea of the present invention is that the definition of the location area used in the RAN is not necessarily the same as the specification of the reporting area used when reporting the location of the mobile to the core network.

The size of the location area is selected preferably by the RAN on the basis of the services used by the subscriber in order to optimize the use of radio resources. Preferably, there is a plurality of location accuracy levels, each having location areas of different sizes.

A reporting area comprises one or a plurality of location areas. The size of a reporting area is selected according to the extent of the accuracy of the location information needed in the core network. The RAN informs the core network when a subscriber moves out of his current reporting area.

A service area is the location accuracy level needed for service management purposes in the core network. It is defined in the core network but is not necessarily known by the RAN. For example, the core network may require the subscriber to reauthenticate itself when entering into a new service area. Also the billing of services may differ from service area to service area. A service area may comprise one or a plurality of reporting areas.

If the RAN uses a location area configuration comprising a plurality of location accuracy levels, the reporting area can be defined as a location area of a specified accuracy level. Alternatively, the reporting area can be equal to a service area, or some specifically specified area. In one embodiment, the service area configuration is known by the mobile station and the reporting area configuration is equal to the service area configuration.

According to one embodiment, the core network and the radio access network negotiate the size of the reporting area prior to the activation of the service. In addition, the reporting areas can be renegotiated when the service is in the active state.

BRIEF DESCRIPTION OF THE FIGURES

The invention is described more closely with reference to the accompanying schematic drawings, in which

*FIG. 5 shows a service area, reporting areas, and location areas.*

DETAILED DESCRIPTION OF THE INVENTION

According to the invention, the concepts of location area, i.e. the location information for the need of the radio access network, and the reporting area, i.e. the location information for the needs of a core network, are separately defined.

The optimal location area configuration of the RAN basically optimizes the usage of radio resources. Core networks rely on the RAN for establishing and optimizing the radio connections. However, also the core networks need location information for their own needs. An example of such need is the tracking service used to track the mobile accurately, e.g. on the accuracy level of one cell. Another example is the Solsa (Support of Localised Service Area) service being currently specified by ETSI (European Telecommunications Standards Institute). Therefore, the RAN provides the core network the location information of a mobile at the accuracy of reporting area specified by the core network. To be able to do this, the radio access network has to track the mobile at least at the accuracy level of one reporting area even if it does not optimize the usage of radio resources.

The optimum size for a location area, i.e. the accuracy of location tracking, depends on the mobility of the subscriber and the amount of pages made per time unit. The amount of pages is strongly dependent on the service used. This is due to the different usage of radio resources for different services. For circuit switched telephony services provided by the GSM core network, for example, the RAN has to page the mobile station from its location area relatively seldom, i.e. only when a mobile station in the idle state is receiving an incoming call. On the other hand, for packet switched services the paging occurs relatively often.

Figure 1:
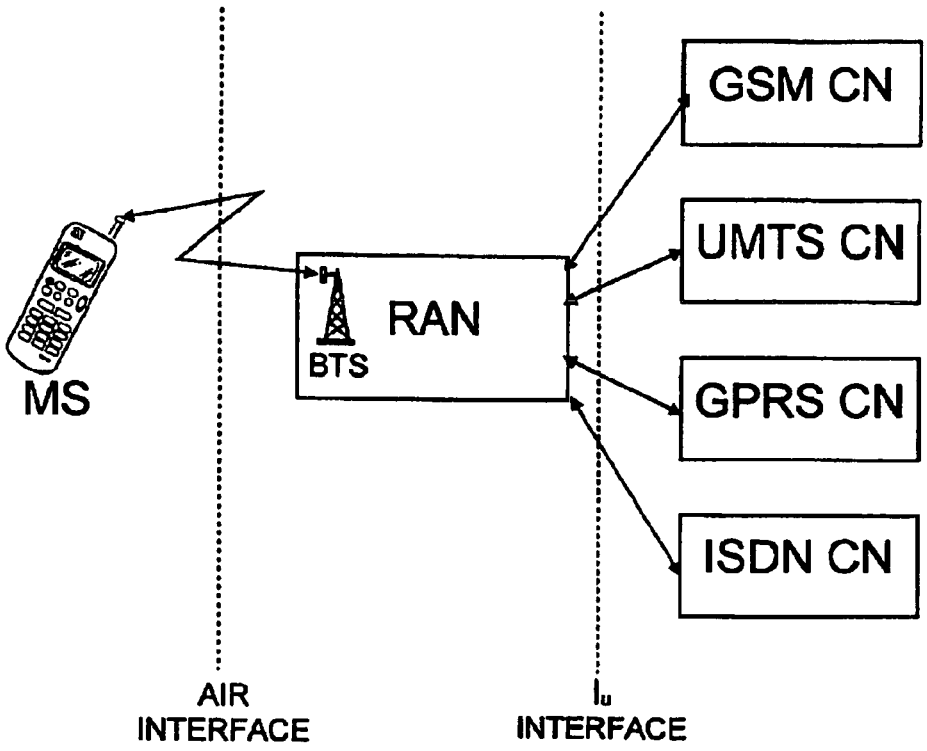
FIG. 1 shows a radio access network connected to a plurality of core networks.
Figure 2:
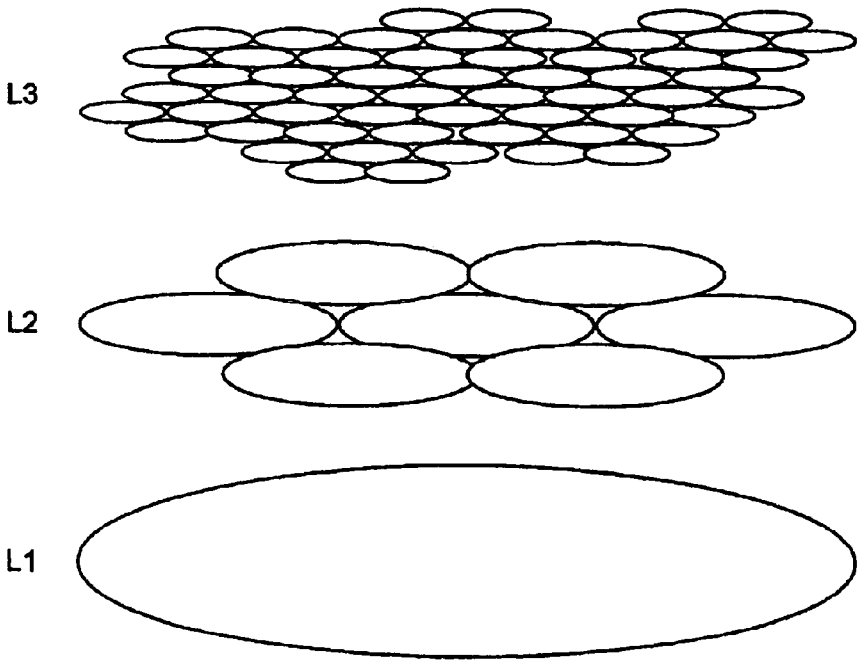
FIG. 2 shows location areas at three different location accuracy levels.

For the above-mentioned reason, the RAN has preferably a plurality of location area levels. An example of an arrangement utilizing a plurality of location accuracy levels is shown in FIG. 2. In the figure, three levels are shown. The lowest level L1 corresponds to large location areas and thus to low accuracy in the tracking of the mobile station. Mobiles at this level have to be paged from a large area, i.e. through a large number of base stations. On the other hand, the subscriber may move around in a relatively large area without having to make a location update. Therefore, the RAN places mobiles that move fast or that are paged relatively seldom at this level.

The middle level L2 has medium size location areas. Here, the mobiles have to be paged from a smaller area, but more location updates have to be performed compared to the location area level L1. This level is suitable for mobiles that are paged more often or that move less than the mobiles that are placed on level L1.

The highest level of accuracy in location tracking corresponds to very small location areas. These location areas may be composed of a single cell, for example. This level is used for services such as the packet switched services, in which a very high number of pages is needed or where the mobile for some other reason needs to be tracked very accurately. An example of such services are tracking services with the basic objective of giving accurate information about the location of the mobile.

The reporting area is specified by the core network and the radio access network is thus informed. The reporting area can alternatively be negotiated by the radio access network and the core network. It is preferable to make it possible to change the reporting area configuration when the service is in an activated state.

According to one embodiment, of the service area configuration is known by the mobile station MS which has been assigned the task of storing information about the service areas of the subscriber, of initiating a location update procedure when entering a new service area, and of instructing the radio access network to forward the new location information to the core network. This situation occurs, for example, when the localized service area configuration of a Solsa subscriber is stored in the SIM (Subscriber Identity Module) card of the subscriber. The service area configuration may be coded, e.g. by listing the cell identities of the cells belonging to the special service areas of the subscriber. Based on this information and the identity information sent by the base stations, the MS notices the change in a service area when entering a new one and initiates a location update. As an alternative implementation the service area configuration may be coded as geographical coordinate information. In this case the mobile station has knowledge about its coordinates. This knowledge can be gathered e.g. by implementing a GPS (Global Positioning System) receiver in the mobile station or using localizing methods of the mobile telecommunication system. In this implementation the mobile initiates a location update when the coordinate information shows that it has moved to a new service area.

It is to be noted that in this embodiment the service area border is not necessarily the same as the location area border, and the service area may thus change within the location area of any location area level defined in the radio access network. However, the mobile station also informs the network also when it moves to a new service area. Thus the RAN tracks the mobile both at the location accuracy level selected by the RAN and at the service area level defined by his subscription. The subscriber thus has a personal location area configuration, the borders of his location areas being defined by the borders of the location areas of a location accuracy level and the borders of his personal service areas. In the context of the location update procedure, the MS instructs the RAN to report the new information about the location of the mobile to the core network. In this case, the reporting area equals the service area configuration known by the mobile station but not by the RAN.

In the following, we shall study embodiments in which the service area configuration is known by the core network. The reporting area can be specified as the location area of a specified location accuracy level shown in FIG. 2. In this embodiment, the core network signals to the RAN the location accuracy level to be used, and the RAN reports to the core network when the mobile moves from one location area of that accuracy level to another location area of the same accuracy level. The core network can define the reporting areas so that a service area is composed of a plurality of reporting areas, for example, *as shown in FIG. 5*. This is preferably particularly when the reporting area is specified as a location area of a location accuracy level. In this embodiment, the reporting areas in the inner parts of the service area could be larger than the reporting areas in the border areas of two service areas. This is easily implemented by specifying the location areas of different location accuracy levels to be used as the reporting areas in different parts of the service area.

Alternatively, the CN can inform the RAN of its own service area configuration, and the RAN reports only the changes in service area, i.e. the reporting area equals the service area. This embodiment requires a larger amount of signaling when specifying the reporting area configuration or when storing the service area configurations of all the core networks in the RAN. The reporting area can also be defined using an arbitrary chosen area. The mapping between the location areas and the reporting areas may be stored in an external database. If the core network needs no information about the subscriber's location, the reporting area can be specified as comprising the whole coverage area of the RAN or by not requiring that a reporting area be specified. In this case, the location will never be reported to the core network.

The location area configuration is specified independently by the radio access network based on the optimization of radio resource usage and the size of the reporting areas specified. The location area configuration optimizing the usage of radio resources for a subscriber may be specified with the help of the past behavior of the subscriber, i.e. the rate of location updates performed and the rate of pages made by the radio access network to locate the subscriber. If the size of the reporting area is smaller than the optimal size of a location area according to radio aspects, the location area is equal to the reporting area.

According to the invention, the radio access network tracks the mobile subscriber with an accuracy of one location area. Changes in the location area are not reported to the core network unless the reporting area changes simultaneously. This can be studied with reference to FIG. 3.

In the figure, a mobile subscriber moves from point A to point C via point B. On the location accuracy level used for this specific mobile, the area shown in the figure is divided into three location areas, LA1, LA2 and LA3. The location areas each comprise a plurality of cells. For each cell, the base station of the cell transmits the location area code(s) of the location area(s) the cell belongs to. If there is a plurality of location accuracy levels, the cells transmit the location area codes of all the location areas they belong to at the different accuracy levels. In addition to the location area configuration, the area is divided into two reporting areas, Reporting Area 1 and Reporting Area 2. The mapping of the cells to different reporting areas is only known by the RAN, and the reporting areas are the location areas of one location accuracy level, for example. However, it must be noted that the reporting areas may also be specified in some other way without losing the general applicability of this example.

In point A, the subscriber is registered in location area LA2 comprising cells 21,22,23,26 and 27 shown in the figure using backward hatch. The mobile station of the subscriber listens to the signals sent by the base stations of the RAN and knows the location area based on the Location Area Code LAC LAC2 transmitted by the base station of cell 22, the cell the mobile is currently visiting.

As the subscriber moves onward, he passes point B belonging to another location area LA1 shown in the figure using a forward hatch. The mobile station of the subscriber determines this based on the location area code LAC1 of the new cell 15 now having the strongest signal at the site of the mobile. Based on the observed change in the location area code, the mobile station initiates a location update procedure. In the procedure, the mobile station initiates a connection with the radio access network to inform it of its new location area. The radio access network, in turn, determines that both LA1 and LA2 belong to the same reporting area, and the reporting area of the mobile phone thus does not change. Therefore, the core network receives no report as to the new location of the subscriber.

As the subscriber moves onward to point C, the signal sent by the base station of cell 33 gets stronger than the signal sent by the base station of cell 15. Therefore, his mobile starts to listen to and decode the signal of cell 33. Cell 33 belongs to location area LA3 shown in the figure using vertical batch. The location area code LAC3 included in the signal indicates that the subscriber has again entered a new location area. Therefore, the mobile contacts the radio access network to inform it of the new location of the mobile subscriber. The radio access network receives this information, and, on the basis of the reporting area configuration defined by the core network determines that the old location area LA1 belongs to reporting area 1 and the new location area LA3 belongs to another reporting area, reporting area 2. Therefore, the radio access network sends the core network notification of the new location of the subscriber.

In response to having received information about the new location of the subscriber, the core network updates this information into its memory. If the subscriber has rights to the same services in both the old and the new reporting areas, the core network returns the radio access network a message indicating that no changes in the services offered are to take place. If the rights differ, the radio access network is informed about the new rights such as limits as to the bit rates the subscriber may use.

We shall next study what kind of information is transferred in the location and reporting area updates. An exemplary signaling chart showing the signaling according to the invention is shown in FIG. 4. The signaling follows the example presented in FIG. 3.

Figure 3:
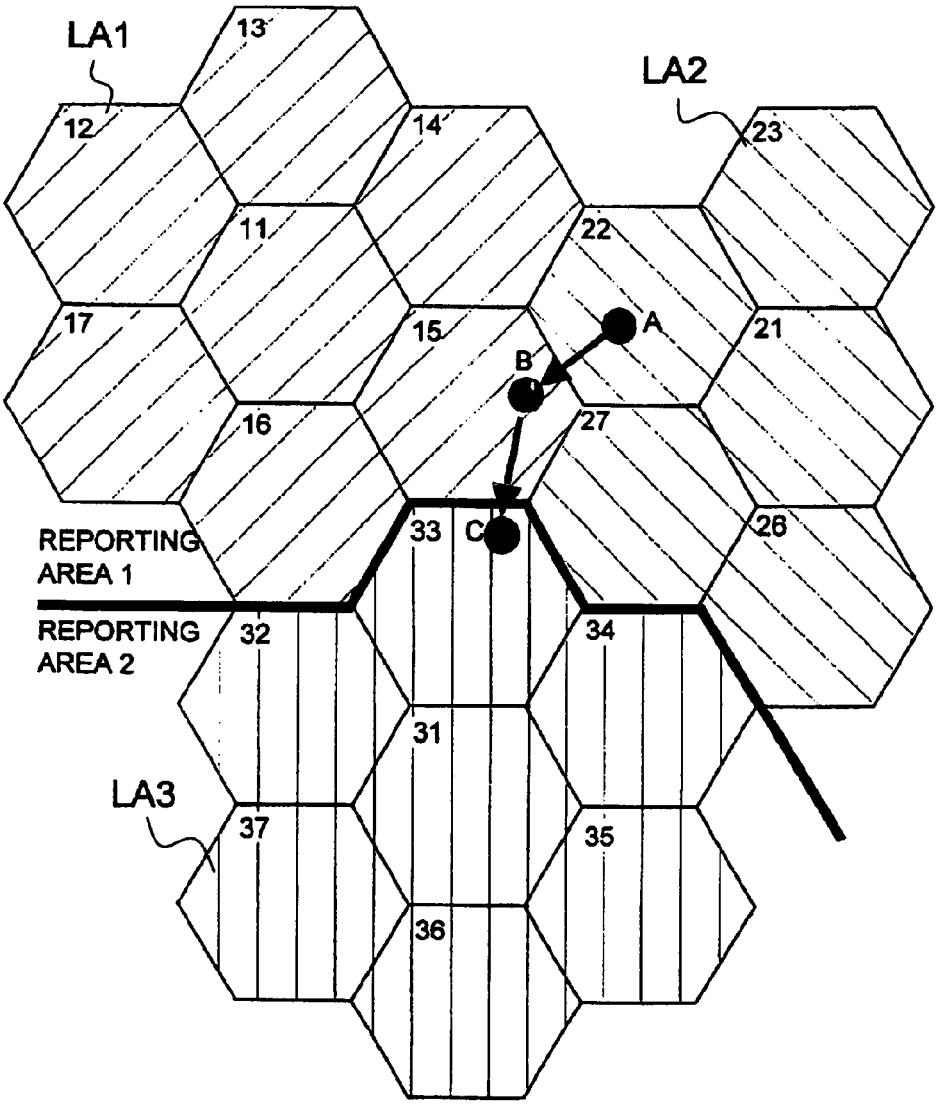
FIG. 3 shows cells of a mobile telecommunication network belonging to three different location areas and two different reporting areas.
Figure 4:
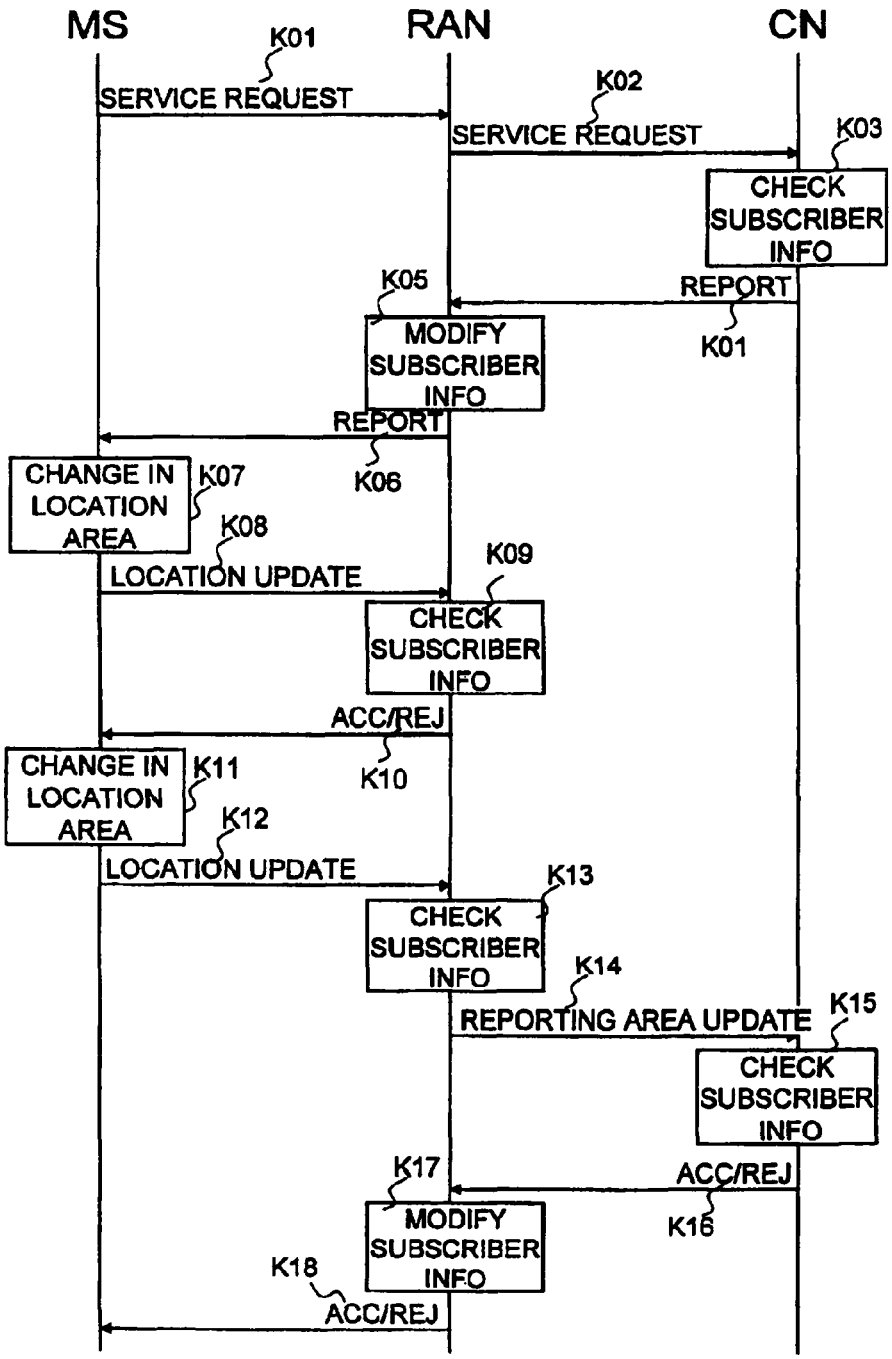
FIG. 4 shows signaling between the mobile station, the radio access network and the core network.

The procedure starts when the mobile station MS at point A of FIG. 3 requests a service provided by a core network by sending the message K01 to the radio access network RAN. The RAN forwards the request to the core network CN in the message K02. The core network consults its subscriber database at stage K03 to check whether the subscriber is entitled to the requested service. The service is activated if the subscriber has rights to the service. In addition, the core network determines the service parameters for the service, such as the reporting areas to be used, the rights of the subscriber, e.g. the Quality of Service QoS the subscriber is entitled to in his present reporting area, and the reporting type, as well as service characteristics. The service characteristics are information concerning the service that the RAN is using to determine the optimal location area configuration from the point of view of radio efficiency.

The reporting can be either indicative or determining, for example. Indicative reporting is used when the subscriber has the same rights in every reporting area, but the core network still wants to have some information about the location of the subscriber. Such reporting can be used for tracking services, for example. In the case of indicative reporting, the radio access network only informs the core network of the new reporting area of the subscriber. On the other hand, determining reporting is used when the services the subscriber is entitled to depend on the reporting area of the subscriber. In this case, the radio access network has to wait for the new set of service parameters provided by the core network before accepting the subscriber's location update for a new reporting area.

The core network reports the reporting area and other parameters determined for the connection to the radio access network in the message K04. The radio access network stores this information in its memory at stage K05. Based on the characteristics of the: activated service (or services), the reporting area defined by the core network (or core networks), and possibly the past behavior of the subscriber, the radio access network defines the level of location accuracy used for the subscriber. The RAN defines identification LA2 of the current location area of the subscriber, and reports the relevant information to the mobile station in message K06. At this stage, the mobile station can start using the services provided by the core network.

After some time, the mobile station has moved to point B in FIG. 3, i.e. from the first location area LA2 to a second location area LA1. The mobile station recognizes that the location area identification it was given is no longer found in the best signal at the site of the mobile station. Therefore, the mobile station initiates a location update procedure by sending the radio access network a location update message K08. In response to having received the message, the RAN checks at stage K09 the subscriber information stored in its memory. Based on the check the RAN determines that the new location area LA2 of the mobile belongs to the same reporting area as the old location area LA1. Therefore, the location update will not be forwarded to the core network, but the RAN determines according to its own criteria, such as radio criteria, whether the location update should be accepted (ACC) or rejected (REJ). This information is then returned to the mobile station in the message K10 to complete the location update procedure.

The mobile station moves on and arrives at point C in FIG. 3. Again, it recognizes that it has entered a new location area at stage K11 and sends the radio access network a location update message K12. In response to having received the message, the RAN checks at stage K13 the subscriber information stored in its memory. Based on the Information, the RAN determines that in addition to the location area, also the reporting area of the subscriber has changed. Thus, the RAN sends the core network a reporting area update message K14. If the reporting is defined as indicative, the radio access network will immediately send the mobile station the message K18 concluding the location update procedure. If the reporting is defined as determining, the radio access network waits for a response from the core network.

In response to having received the message K14, the core network stores the new location information and checks the subscriber information of the subscriber at stage K15. In the new reporting area, the subscriber may have different service parameters than it has in the old reporting area. For example, the subscriber may have rights for both speech and multimedia services in the old reporting area, but only for speech in the new reporting area. It is also possible that the subscriber has no rights to any service in the new reporting area. Additionally, the Quality of Service QoS the subscriber is entitled to may differ from reporting area to reporting area. The core network may also request the mobile station to reauthenticate itself in connection with the service area update.

Having defined the service parameters, the possible request of reauthentication procedure, etc., the core network sends this information to the radio access network in message K16.

The radio access network receives message K16 and modifies the subscriber information of that subscriber in its memory at stage K17. The radio access network then defines the identity of the new location area of the subscriber and sends this information to the mobile station together with other relevant information concerning the new reporting and location areas in message K18.

To implement the invention, the radio access network must be adapted to

- store information concerning a plurality of location areas and a reporting area comprising at least one location area,
- tracking the mobile station :with an accuracy of one location area, and
- reporting to the core network the changes in location with an accuracy of one reporting area.

Preferably, the RAN is in addition adapted to negotiate the size of the reporting area with the core network. These arrangements may either all be centrally implemented in one network element or distributed over a plurality of network elements of the RAN.

The core network, on the other hand, must be adapted to receive messages reporting the changes in the location of a mobile station with an accuracy of one reporting area and to define the current service area of the mobile station based on the reported location. The core network is in addition preferably adapted to negotiate the size of the reporting area with the radio access network. As for the RAN, these arrangements may either all be centrally implemented in one network element or distributed over a plurality of network elements of the core network.

As an advantage of this invention, the accuracy of location information held in the core networks is optimized for the needs of the core network, which is independent of the needs of the radio access network. This reduces signaling over the $I_u$ interface and unnecessary control operations run in the core network.

What is claimed is:

[1. A method of location management in a mobile telecommunication system comprising mobile stations, at least one core network providing telecommunication services, and a radio access network providing connections between the mobile stations and the core network, and in which system information concerning the location of the mobile station is stored in the radio access network, comprising

- tracking in the radio access network of the location of the mobile station to the accuracy of a location area,
- determining in the core network a reporting area comprising at least one location area,
- informing the radio access network by the core network of the reporting area determined,
- receiving at the radio access network a location update from the mobile station,
- determining by the radio access network based on the location update whether or not the mobile station has moved out of the reporting area, and
- sending by the radio access network to the core network a report if the mobile station has moved out of the reporting area.]

2. [The method according to claim 1,] *A method of location management in a mobile telecommunication system comprising mobile stations, at least one core network providing tele-*

*communication services, and a radio access network providing connections between the mobile stations and the core network, and in which system information concerning the location of the mobile station is stored in the radio access network, comprising*

*tracking in the radio access network of the location of the mobile station to an accuracy of a location area,*

*determining in the core network a reporting area comprising at least one location area,*

*informing the radio access network by the core network of the reporting area determined,*

*receiving at the radio access network a location update from the mobile station,*

*determining by the radio access network based on the location update whether or not the mobile station has moved out of the reporting area,*

*sending by the radio access network to the core network a report if the mobile station has moved out of the reporting area; and*

*not sending the core network said report if the mobile station has not moved out of the reporting area,* wherein a plurality of location accuracy levels is defined, each location accuracy level having location areas of different sizes, and the radio access network selects one of these accuracy levels to be used for tracking the mobile station.

[3. The method according to claim 2, wherein the reporting area is a location area of one location accuracy level.]

[4. The method according to claim 2, wherein the radio access network selects the location accuracy level based on the services currently used by a subscriber using the mobile station.]

[5. The method according to claim 2, wherein the radio access network selects the location accuracy level based on service parameters given by the core network.]

[6. The method according to claim 2, wherein the radio access network selects the location accuracy level based on the past behavior of a subscriber using the mobile station.]

[7. The method according to claim 6, wherein the behavior of the subscriber is determined based on the number of pages that the radio access network has performed to locate the mobile station and the number of location updates that the mobile station has performed.]

[8. The method according to claim 2, wherein the radio access network informs the mobile station of the location accuracy level to be used when tracking the mobile station.]

9. The method according to claim [1] *2*, wherein the core network requests that a mobile station reauthenticates itself when the mobile station moves to a new reporting area.

[10. The method according to claim 1, wherein the mobile station is entitled to different services in different reporting areas.]

11. The method according to claim [1] *2*, wherein the mobile station is entitled to different qualities of service in different reporting areas.

12. The method according to claim [1] *2*, wherein the core network and the radio access network negotiate the size of the reporting area to be used.

[13. The method according to claim 12, wherein the negotiation takes place when the service is activated.]

[14. The method according to claim 12, wherein the negotiation takes place when the service is in an activated state.]

15. The method according to claim [1] *2*, wherein the service parameters for different service areas for the services a subscriber using the mobile station has subscribed to are specified and stored in the core network, the mobile station initiates a location update process when entering into a new reporting area, in response to having received the location update, the radio access network forwards the new location information of the mobile station to the core network, the core network receives the new location information and defines a new service area for the subscriber, checks the service parameters of services the subscriber is entitled to in the new service area, and sends the radio access network information about the new service parameters, the radio access network receives the information about the new service parameters and completes the location update process by sending the mobile station a response.

[16. The method according to claim 1, wherein information about reporting area configuration is stored in the mobile station, and when entering a new service area, the mobile station initiates a location update process, instructing the radio access network to forward the new location information to the core network, and the radio access network forwards the location information to the core network.]

[17. The method according to claim 16, wherein the information about the service area configuration is given as a list of cells.]

[18. The method according to claim 16, wherein the information about the reporting area configuration is given as coordinates of the reporting area and the mobile station observes its coordinates and initiates a location update when entering into a new reporting area.]

[19. The radio access network for a mobile telecommunication system comprising mobile stations, at least one core network providing telecommunication services, and a radio access network, providing connections between the mobile stations and the core network, and in which system information concerning the location of the mobile station is stored in the radio access network, the radio access network adapted to use a location area configuration to track the location of the mobile station on the accuracy of one location area, receive information on a reporting area determined by the core network, receive a location update from the mobile station, determine, based on the location update, whether or not the mobile station has moved out of the reporting area, and send the core network a report if the mobile station has moved out of the reporting area.]

[20. The network element for a radio access network of a mobile telecommunication system comprising mobile stations, at least one core network providing telecommunication services, and a radio access network providing connections between the mobile stations and the core network, and in which system information concerning the location of the mobile station is stored in the radio access network, the network element adapted to use a location area configuration to track the location of the mobile station on the accuracy of one location area, receive information on a reporting area determined by the core network, receive a location update from the mobile station, determine, based on the location update, whether or not the mobile station has moved out of the reporting area, and send the core network a report if the mobile station has moved out of the reporting area.]

[21. The core network for a mobile telecommunication system comprising mobile stations, at least one core network providing connections between the mobile stations and the core network, and in which system information concerning the location of the mobile station is stored in a radio access network, and the radio access network uses a location area configuration to track the location of the mobile station on the accuracy of one location area, the core network adapted to determine a service area comprising at least one location area, inform the radio access network of the reporting area determined, and to receive a report from the radio access network when the mobile station has moved out of the reporting area.]

*22. A method, comprising: tracking a location of a mobile station in a radio access network with an accuracy of a location area, the radio access network providing connections between mobile stations and a core network providing services to the mobile stations;*

*determining a reporting area comprising at least one location area;*

*determining a change in the location of the mobile station when the mobile station moves from a first location area to a second location area;*

*reporting to the core network the change in the location of the mobile station only when the mobile station also moves from a first reporting area to a second reporting area; and*

*not reporting to the core network the change in the location of the mobile station when the mobile station has not moved from the first reporting area to the second reporting area,*

*wherein the core network requests that a mobile station authenticates itself when the mobile station moves to a new reporting area.*

*23. The method according to claim 22, wherein the mobile station is entitled to different qualities of service in different reporting areas.*

*24. The method according to claim 22, wherein the core network and the radio access network negotiate the size of the reporting area to be used.*

* * * * *